United States Patent [19]

Foladare et al.

[11] Patent Number: 5,848,140

[45] Date of Patent: *Dec. 8, 1998

[54] MULTI-NETWORK FEATURE APPLICATION

[75] Inventors: Mark J. Foladare, Middlesex; David P. Silverman, Somerset; Mohsen Soroushnejad, Monmouth, all of N.J.

[73] Assignee: AT&T Corp., Middletown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 580,679

[22] Filed: Dec. 29, 1995

[51] Int. Cl.⁶ .............................. H04M 3/42; H04M 7/00
[52] U.S. Cl. ........................ 379/201; 379/212; 379/219; 379/220; 379/229; 379/230
[58] Field of Search ................................ 379/67, 88, 89, 379/201, 212, 230, 220, 229, 219

[56] References Cited

U.S. PATENT DOCUMENTS

| | | | |
|---|---|---|---|
| 5,259,026 | 11/1993 | Johnson | 379/207 |
| 5,502,756 | 3/1996 | Crocker et al. | 379/29 |
| 5,541,917 | 7/1996 | Farris | 370/60.1 |

*Primary Examiner*—Fan S. Tsang
*Assistant Examiner*—Allan Hoosain

[57] ABSTRACT

A method and system are disclosed which allow a telecommunications network carrier to apply services and/or features to calls carried by another independent telecommunications network carrier. The method and system enable the receipt of a call, made by a caller to a virtual telephone number, at an MFA switch in a telecommunications network. A determination is made as to whether the call is a special call by way of a Dialed Number Trigger Table. If the call is not a special call it is routed to its destination. Otherwise, a database query identifies from the dialed virtual telephone numbers an actual telephone number representing an end user device corresponding to the virtual telephone number. A determination of whether a service is to be applied to the call is made and, if so, the service is applied. The call is then routed from the MFA switch to a device located outside the telecommunications network for connection to the end user telephone device represented by the actual telephone number.

21 Claims, 5 Drawing Sheets

MULTI-NETWORK FEATURE APPLICATION

FIELD OF THE INVENTION

The present invention relates to call processing and, more particularly, to applying services using one telecommunications network to calls carried at least partly by another telecommunications network.

BACKGROUND OF THE INVENTION

Modem telecommunications carriers typically offer many services and features that provide convenience to their subscribers. Services such as call waiting, messaging, call forwarding, speech processing, and Centrex-type services have become commonplace, with new services being added at a rapid pace.

Unfortunately, since there are numerous telecommunications carriers, and the call processing provided by any carrier is essentially independent of the call processing provided by any other carrier, at least one of the carriers carrying a particular call must provide a given service and make it available on the call for it to be applied to the call. In other words, if carriers A, B, and C are interconnected to carry a call, e.g., A and C are local exchange carriers (LEC's) and B is an interexchange carrier (IXC), and none of the carriers provide a particular service for that call, then the parties connected by that call must do without that service.

SUMMARY OF THE INVENTION

Since the subscribing party is not typically the one responsible for choosing the telecommunications carriers for the call, we have recognized that it would be a boon to subscribers of a given telecommunications carrier if they could receive services and features provided by that telecommunications provider, even when that telecommunications carrier is not selected to carry any portion of a call to the subscriber. In particular, in the conventional LEC-IXC-LEC arrangement of the telephone network, there is a need in the telecommunications art for a method and system which would enable the services of one IXC to be applied to calls which were to be carried by a different IXC selected by the party choosing the telecommunications carrier of the call.

To this end, we advance the art by allowing services and/or features offered by a telecommunications carrier not selected to carry a call to be applied to such calls anyway. This is achieved generally by a) receiving a call made to one of a particular group of telephone numbers that is carried by the network of a first telecommunications carrier at the behest of the party responsible for selecting the carrier for the call at a switch in the network of a second telecommunications carrier that was not selected by the responsible party to carry the call and b) applying any necessary service by the network of the second telecommunications carrier. Since selection of the telecommunications carriers is typically at the discretion of the call originator, the invention most often benefits the call recipient.

In one embodiment of the invention, calls that are carried by the telecommunications network of a first IXC and are placed to particular virtual telephone numbers have services or features applied by the telecommunications network of a second IXC. For purposes of this invention, a "virtual" telephone number is a telephone number that appears to the caller to be associated with a called party or particular terminating telecommunications equipment but, instead, is actually associated with the network of a second telecommunications carrier, e.g., an IXC, that is to apply the service or feature. The telecommunications network of the second IXC which applies the service has a Multi-network Feature Application (MFA) switch, a MFA node, and a database. The database correlates each of the virtual telephone numbers with a corresponding "actual" telephone number that is the telephone number associated with a called party or particular terminating telecommunications equipment.

When the network of a LEC terminating a call recognizes that the call was placed to one of the virtual telephone numbers it routes the call to the MFA switch of the network of the second IXC. The call is routed to the MFA switch not for primary switching and transmission purposes, but instead for feature and service application purposes. If the second IXC determines that a service or feature should be applied, it applies the service to the call and completes the call back through the terminating LEC to telecommunications equipment represented by the actual telephone number, unless the feature or service involved relates to redirecting the call, in which case the call is appropriately routed.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

For purposes of clarity of presentation and ease of understanding the invention, for a call carried by a first network to which a service is applied by a second network, the term "Multi-network Feature Application (MFA) Switch" or "MFA Switch" means the switch in the network which does not carry the call but, nonetheless, may apply features to a call or a switch in the non-carrier network which connects the call to an MFA Node in the non-carrier network. An MFA Node is a node which provides intelligence and switching functionality. One example of a device suitable for use as an MFA Node is an AT&T Conversant™ which is commercially available from AT&T Corp.

It will be recognized that additional switches in the carrier network, the non-carrier network, or some other network may be encountered between the "MFA switch" as used herein and the ultimate destination for the call, for example, where multiple features are applied to the call, or additional routing is necessary to complete the call to its ultimate destination. Additionally, although the invention is described by way of ordinary telephone calls with the end user equipment being shown as ordinary known telephone devices, it should be understood that the invention may also be straightforwardly implemented for networks carrying multimedia calls or calls in which the end user equipment is mobile (i.e. a cellular telephone or radio-phone).

Although described in connection with a forwarding service, it will be recognized that an advantage of the invention is that it may be straightforwardly implemented for other services and features, such as forwarding, messaging, waiting, as well as features employing speech processing. Additionally, an added feature of the invention is that it allows the application of Centrex-type services, for example, hold, transfer, conference, volume adjustment and calling or called party identification.

Figure 1:
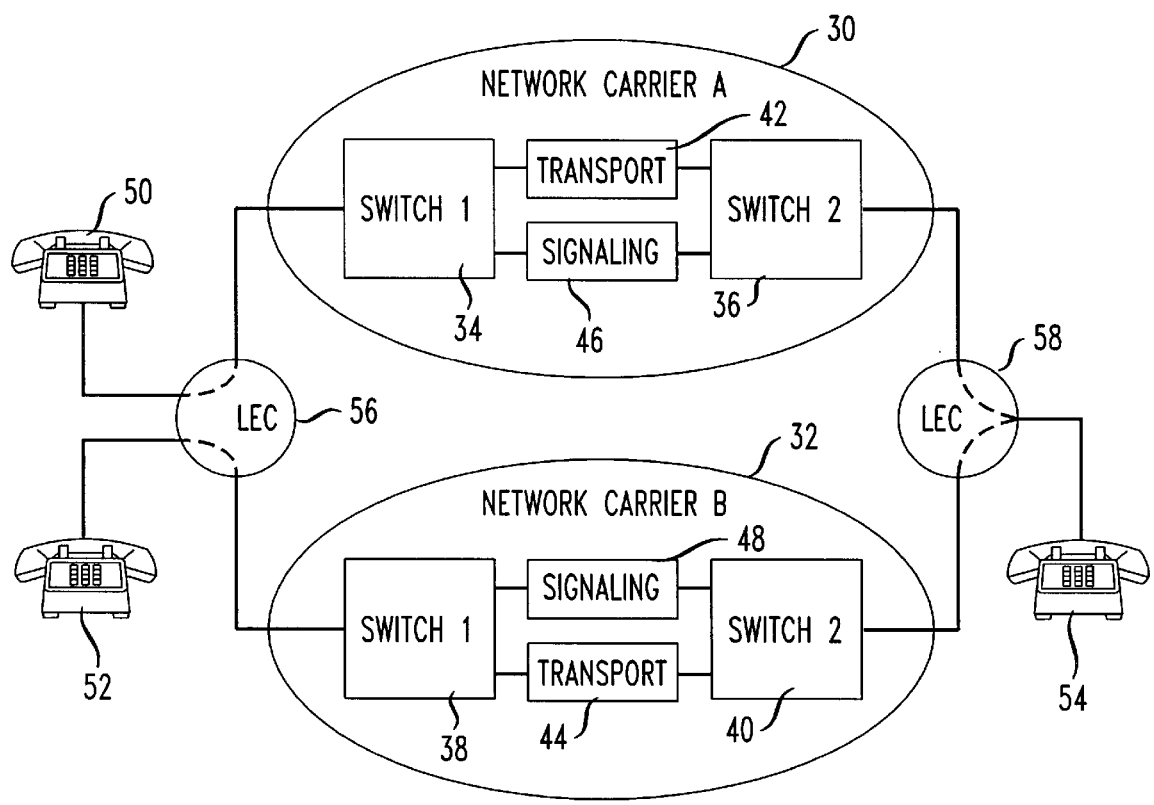
FIG. 1 shows a simplified block diagram of two telecommunications networks which carry calls in accordance with the invention.

FIG. 1 shows a simplified block diagram of two telecommunications networks 30, 32, designated "A" and "B", (sometimes referred to as interexchange carriers, IXCs or network carriers) which interact with calls in accordance with the invention. As shown, each network includes two switches 34, 36, 38, 40, of, for example, the No. 4ESS™ (electronic switching system) design as described by A. E. Ritchie, et al., in the Bell System Technical Journal (BSTJ), September, 1977, Volume 56, No. 7, or, the No. 5ESS™ (electronic switching system) design as extensively described by K. E. Martersteck, et al., in AT&T Technical Journal, Volume 64, No. 6, part 2, pp. 1305–1564, July/August, 1985, incorporated herein by reference. In a known manner, transport 42, 44 and signaling 46, 48 equipment, all known in the art, provide for call routing and couple the switches 34, 36 and 38, 40 to each other.

Known telecommunication devices, for example, telephones 50, 52, 54, serve as the initiating and destination points for calls and are identifiable by actual telephone numbers. Local Exchange Carriers (LECs) 56, 58 provide the interface between networks 30, 32 and the telecommunication devices 50, 52, 54.

When a call is placed from a telephone 50 to a telephone number, typically, the call is first carried by a LEC 56 which identifies the proper IXC 30 for the call. The call is then routed to the identified IXC 30. Once the call reaches the IXC 30, the services and features offered by the IXC 30 may be applied to the call. The call is carried via switches 34, 36 in the IXC 30 to another LEC 58, which routes the call to a device 54 at the end user equipment or end user device represented by the actual telephone number.

When a call is placed from a different telephone 52 to the same actual telephone number, the call may be carried by a different IXC 32. Since the IXC 32 is different, the services and features which may be applied to the call by that IXC 32 may differ, even though the calls share common LECs 56, 58 and the same endpoint 54. The services and features are dependent upon the carrier network. In other words, assume that Network Carrier A 30 offers a forwarding service which is not offered by Network Carrier B 32, and a party represented by a telephone number associated with an end user device 54 subscribes to the forwarding service offered by Network Carrier A 30. If a caller utilizing end user equipment 50 places a call to the telephone number associated with the subscriber's end user equipment 54, and the caller has chosen for the call to be carried by Network Carrier A, the forwarding service can be applied. If however, a caller, utilizing end user equipment 52, places a call to the number associated with subscriber's end user equipment 54, and that caller has chosen for the call to be carried by Network Carrier B, the call must "touch" Network Carrier A for the forwarding service to be applied. This is accomplished if the second call is routed by the LEC 58 to a switch external to the IXC 32 carrying the call, for example, to a switch in the first IXC 30 described above. Since the call then touches the first IXC 30, the services and features offered by that IXC 30 can be applied to the call.

Figure 2:
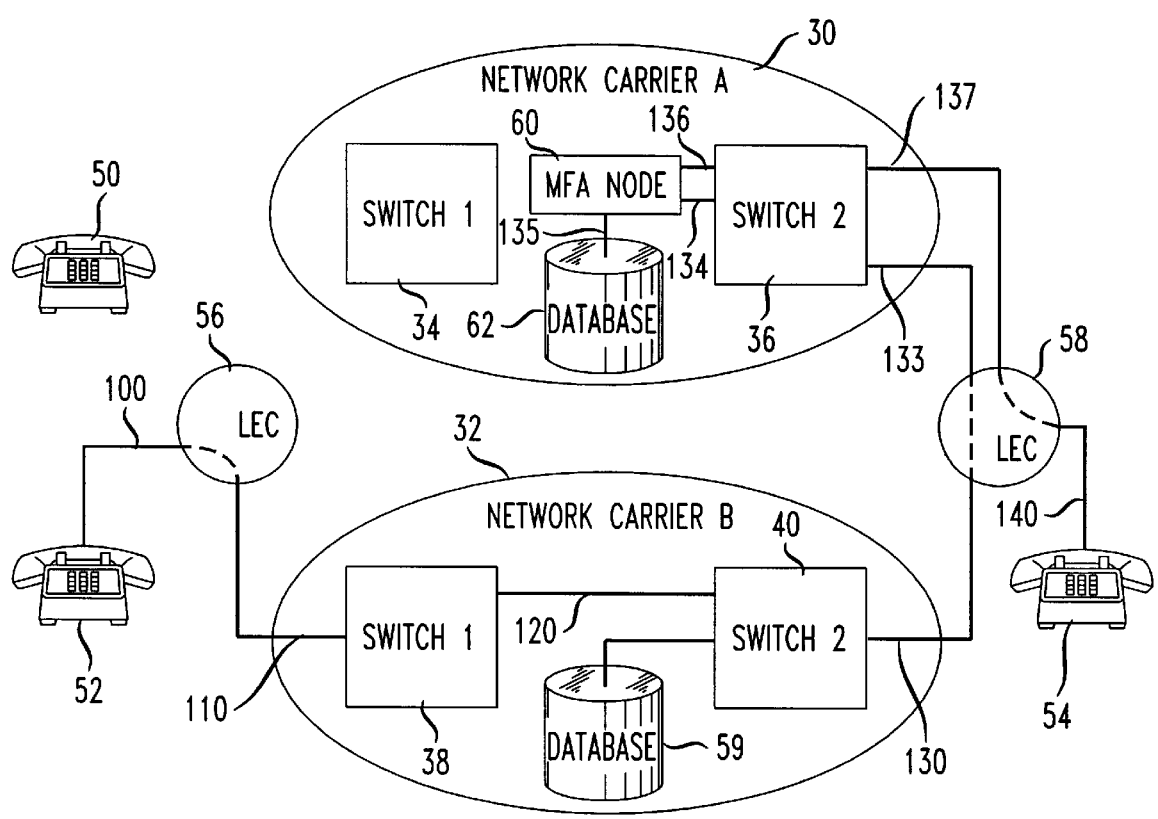
FIG. 2 shows a simplified block diagram of the networks of FIG. 1 in accord with a preferred embodiment of the invention wherein a call is carried by one network and a service is applied to the call by another network.

FIG. 2 shows a simplified block diagram of the networks of FIG. 1, in accord with a preferred embodiment of the invention, (with various network elements omitted for clarity because they are not necessary for an understanding of the invention) wherein a call is carried by one IXC 32, designated "Network Carrier B", and a service is applied to the call by another IXC 30, designated "Network Carrier A".

Network Carrier B 32 is constructed in the same manner as described in connection with FIG. 1 except it includes a database 59 connected to a switch 40. Network Carrier A 30 is also constructed in the same manner as described in connection with FIG. 1 except it further includes a Multi-network Feature Application Node (MFA Node) 60 and a Multi-network Feature Application Database (MFA DB) 62. The MFA Node 60 is connected to a switch which is functionally configured as an MFA Switch 36. As shown, the MFA Node 60 is an adjunct. In alternative embodiments, the MFA Node 60 may be part of the MFA Switch 36 or part of another switch in the IXC 30 (not shown) connected to the MFA Switch 36. Additionally, it should be understood that, in still other embodiments, the MFA Switch 36 may be configured to also provide non-MFA Switch related functionality.

Although the transport 42, 44 and signaling 46, 48 elements of FIG. 1 are not shown in FIG. 2, they should be understood to be present.

The database 59 in the IXC 32 contains indicators which identify that a particular service or feature should be applied by the IXC 32 to calls carried by the IXC 32 and destined for particular end user equipment. The application of services and features to a call are well known.

The MFA DB 62 is a database which contains listings of virtual phone numbers correlated to actual telephone numbers associated with end user equipment or end user devices. In a preferred embodiment, the MFA DB 62 also contains indicators which identify a particular service or feature which should be applied to calls destined for a particular actual telephone number, for example, forwarding, messaging, waiting or identification. It will be recognized that in alternative embodiments, the database correlating phone numbers and the indicator database may be constructed as separate databases remotely located from each other.

As discussed herein, a "virtual" telephone number is the telephone number which, if dialed, physically terminates at an MFA Switch. An "actual" telephone number is the number which the MFA Switch connects to, in order to complete the call to its ultimate destination. Assignment of virtual and actual telephone numbers for inclusion in the MFA DB 62 is handled differently depending upon whether a subscriber is assigned a new telephone number or merely adds the service and retains an existing telephone number.

When a new subscriber obtains a new telephone number, for example, as the result of moving to a new residence or adding an additional phone line, the number provided to the subscriber is a "virtual" telephone number which terminates at an MFA switch, rather than an "actual" telephone number which is associated with the subscriber's end user equipment 54. This virtual number is the one the subscriber gives out and would be found in a directory. In other words, the virtual number does not terminate at the subscriber's end user equipment. Instead, the virtual number identifies a telephone line which physically terminates in an MFA switch 36 located in the network 30 which will apply the service. A different "actual" number is assigned to the subscriber's end user equipment 54, but the correlation between the actual number and the subscriber's end user equipment 54 is known only to the network 30. The virtual and actual numbers are then correlated in the MFA DB 62 for call processing as will be described below.

For an existing subscriber, the setup is slightly different. Since the subscriber already has a phone number which represents the subscriber's end user device 54, and that number may be widely distributed, the existing number is made into the "virtual" telephone number, i.e., the physical connections will be controlled so that, when the virtual number is dialed, the call will terminate in the IXC's 30 MFA switch 36. A new "actual" telephone number is then associated with the subscriber's end user equipment 54, but again, the correlation is known only to the network 30. The two numbers are then correlated in the MFA DB 62 for call processing as described herein.

The MFA Node 60 serves as the interface between the MFA switch 36 and the MFA DB 62. The MFA Node is, for example, an AT&T Conversant™ which provides intelligence and switching functionality or another device or device combination capable of providing similar functionality. The AT&T Conversant™ is commercially available from AT&T Corp. As will be described further below, the MFA Node 60 may also be constructed to provide in-call monitoring.

In operation, the call flow proceeds as follows. A caller 52, whose calls are carried by Network Carrier B 32, places a call to a called party. The call proceeds to the LEC 56 servicing that party's call (Step 100). The LEC 56 recognizes the call as one to be carried by Network Carrier B 32 and routes the call accordingly (Step 110). The call is routed through switches 38, 40 in the network 32 (Step 120) to a LEC 58 associated with routing the virtual number to its destination (Step 130). During passage of the call through Network Carrier B 32, services or features, for example, Centrex-type conferencing, may be applied to the call according to known methods using the database 59 connected to one of the switches 40.

The LEC 58 routes the call to an MFA switch 36 in Network Carrier A 30 (Step 133) where it proceeds to its "virtual" termination in an MFA Node 60, i.e. the terminating point for the virtual number (Step 134). The call is routed to the MFA switch 36 for feature and service application purposes, rather than for primary switching and transmission purposes. The MFA Node queries the MFA DB 62 and receives back the actual telephone number which correlated to the virtual telephone number (Step 135). The MFA Node 60 then forwards the call and the actual number to the MFA switch 36 (Step 136) so that it can be routed to its ultimate destination, the end user equipment 54 associated with the called party based upon the actual number (Steps 137 and 140). One will appreciate that the completion of the call may result in the call returning to the same LEC 58 or, if the feature or service involved relates to redirecting the call, to another LEC (not shown).

It will be recognized that services and features may also be independently applied to the call by the carrier IXC 32 in the manner described above. In other words, the carrier IXC 32 can apply, for example, Centrex-type conferencing, while the IXC 30 applies, for example, call forwarding to the call, with the feature or service being applied by one IXC 30, 32 being independent of any feature or service applied by the other IXC 30, 32.

Figure 3:
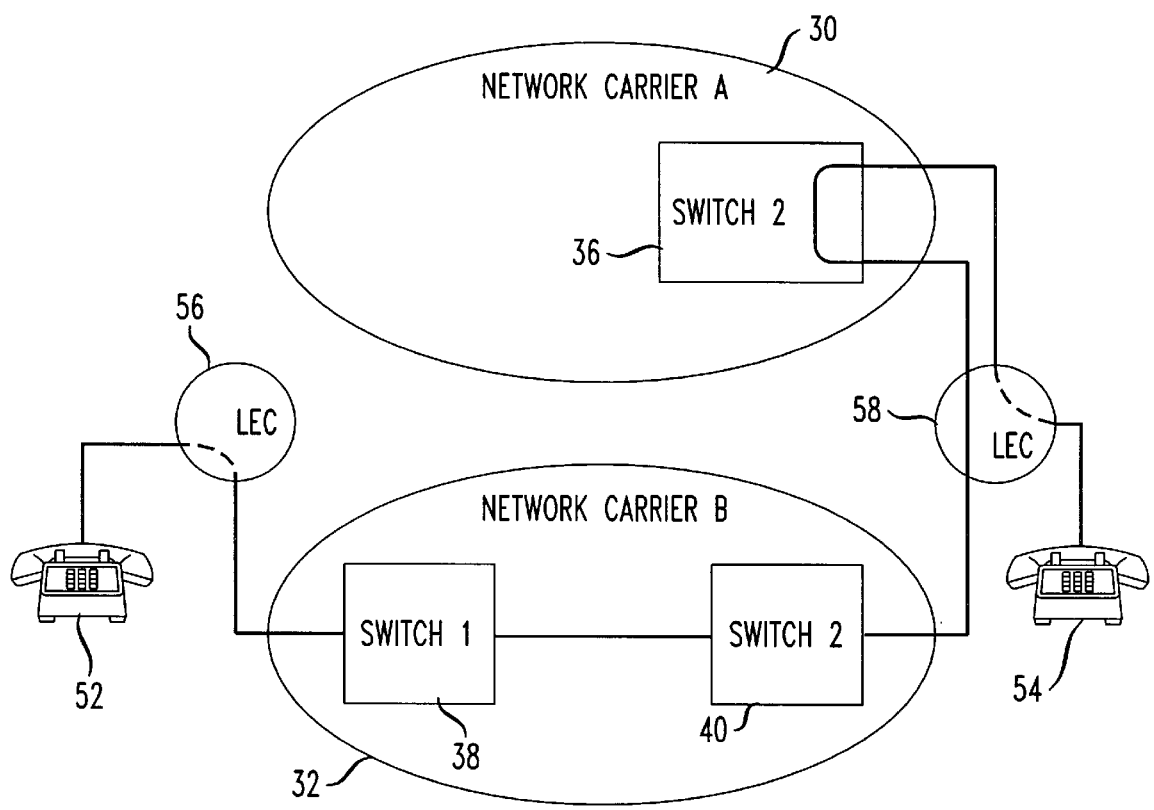
FIG. 3 shows a simplified call connection path for calls completed as shown and described in connection with FIG. 2.

FIG. 3 shows a simplified call connection path for calls completed as shown and described in connection with FIG. 2. As will now be evident from the figure, although the call is carried by one IXC 32, services and featured offered by another IXC 30 can be applied to the call since it "touches" that IXC 30.

Utilizing the arrangement of FIG. 2, it will be recognized that, redundant processing will result if the carrier network is also the network containing the MFA Node used for applying the feature or service. In other words, for calls normally carried by Network Carrier A 30, a call made to a virtual number for termination at the MFA Node 60, will proceed through the network to the LEC 58, only to be diverted back to that network for termination. As a result, in a preferred embodiment, the call is processed so that calls to virtual numbers carried by Carrier Network A 30 do not experience the redundant processing.

Figure 4:
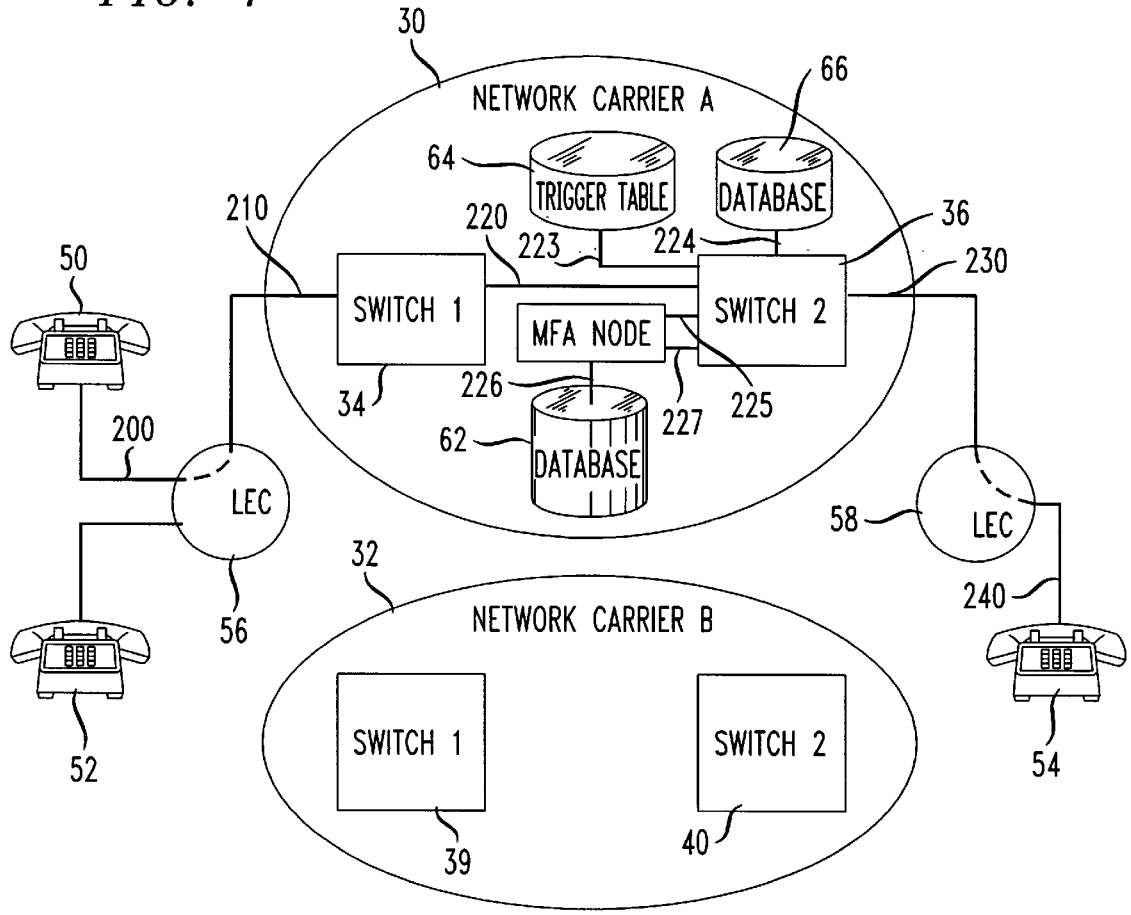
FIG. 4 shows a simplified block diagram of the networks of FIG. 2 arranged for processing calls carried by the network which applies the service.

Turning now to FIG. 4, which shows the networks of FIG. 2 arranged for processing calls carried by the network which applies the service so as to avoid the aforementioned redundant processing. As discussed above, Network Carrier B 32 is constructed in the same manner as described in connection with FIG. 1. Network Carrier A 30 is also constructed in the same manner as described in connection with FIG. 2 except it further includes a Dialed Number Trigger Table 64 and an additional processing Database (DB) 66. The Dialed Number Trigger Table 64 is a listing of phone numbers which would be returned to the switch 36 after passing through the LEC 58 by virtue of the use of a virtual telephone number, thereby causing redundant processing. The Dialed Number Trigger Table 64 is implemented in a similar fashion to known ANI trigger tables used for triggering in intelligent call processing, except the Dialed Number Trigger Table 64 is modified to trigger off of a particular dialed number rather than the ANI of the calling number. The Dialed Number Trigger Table 64 is utilized to screen all calls carried by the network passing through the switch 36 and to trap calls which would otherwise be diverted back into the network to the switch so that the above redundant processing is avoided. The DB 66 contains the necessary information and signaling to identify to the switch 36 that the call is subject to processing as a Multi-network Feature Application (MFA) call.

In operation, the call flow proceeds as follows. A caller 50, whose calls are carried by Network Carrier A 30, places a call to a called party. The call proceeds to the LEC 56 servicing that party's call (Step 200). The LEC 56 recognizes the call as one carried by Network Carrier A 30 and routes the call accordingly (Step 210). The call is routed through the network (Step 220) to a switch 36 which compares the dialed number of each call with the listings in the Dialed Number Trigger Table 64 (Step 223) described below and determines if the call is a special call, i.e. the dialed number is one which will result in the call being returned to Network Carrier A 30 by a LEC 58 after exiting the network 30. This is accomplished by using a processor in the switch 36 to compare the dialed number of the call to the list of stored numbers in the Dialed Number Trigger Table 64. If the dialed number is not in the Dialed Number Trigger Table 64, the call is routed normally to its destination. If however, the dialed number of the call is in the Dialed Number Trigger Table 64, the DB 66 is queried (Step 224) to identify to the switch 36 that the call is a special call. In other words, the call is subject to processing which includes the processing of the call as a Multi-network Feature Application call. Once identified as such, the switch 36 sends the call to the MFA Node 60 (Step 225) which queries the MFA DB 62 to obtain the actual telephone number correlated to the dialed virtual telephone number and to identify the feature or service to be applied to the call. The MFA Node 60 receives back the actual telephone number which is correlated to the virtual telephone number (Step 226) and the identification of the feature or service to be applied. The MFA Node 60 then returns the call and the actual number to the switch 36 (Step 227) so that it can apply the indicated service and route the call directly to its ultimate destination at end user equipment 54 associated with the called party (Steps 230 and 240). In this manner, the call is processed without being sent by the LEC 58 back into the network 30 to the switch 36.

Figure 5:
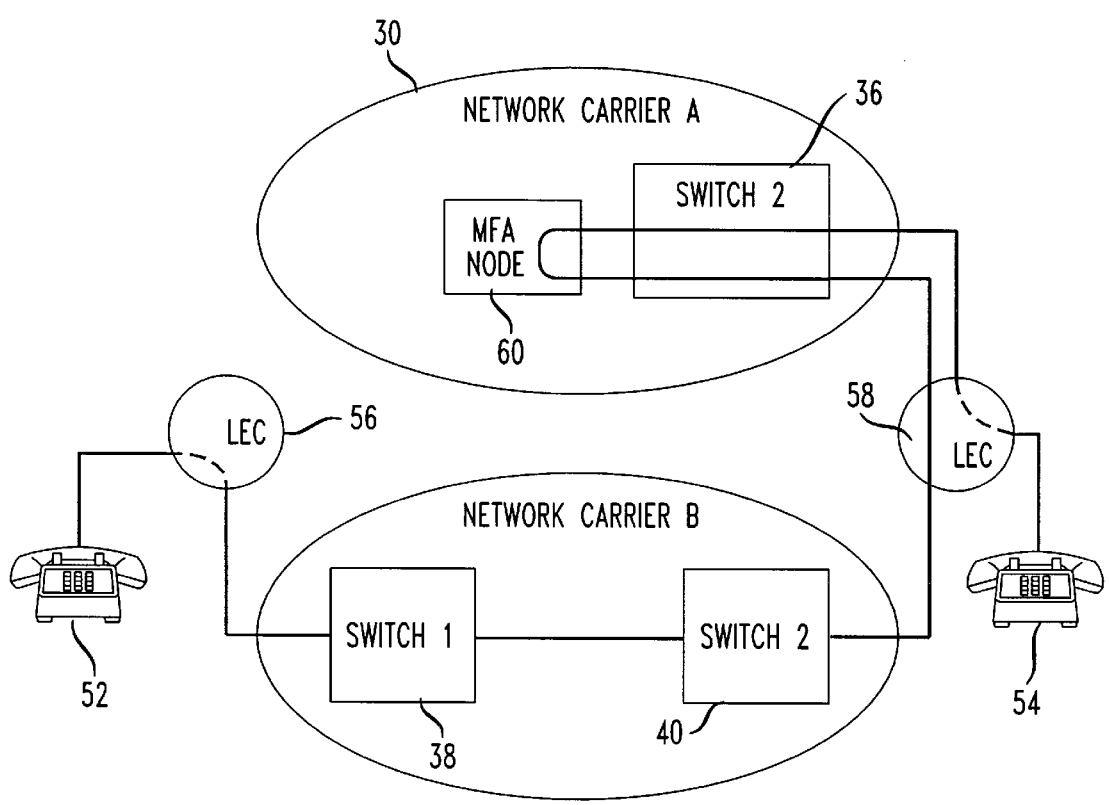
FIG. 5 shows a simplified call connection path which includes in-call monitoring in accordance with the invention.

In another preferred embodiment, the call may be hairpinned in a known manner into the MFA Node 60. Because the MFA Node 60 is configured, in a known manner, to allow in-call monitoring, by hairpinning the call in the MFA Node 60 in-call monitoring of calls carried by one network may be independently provided by a non-carrier network. A call connection path which includes in-call monitoring in accordance with the invention is shown in FIG. 5.

Thus, while there have been shown and described and pointed out fundamental novel features of the invention as applied to a preferred embodiment thereof, it will be understood that various omissions and substitutions and changes in the form and details of the disclosed apparatus, and in its operation, may be made by those skilled in the art without departing from the spirit of the invention. It is to be further understood that the drawings are intended solely for purposes of illustration and not as a definition of limits of the invention, the limits being defined solely by the claims.

What is claimed is:

1. A method of applying services to calls, carried by a carrier telecommunications network including signaling and transport equipment, using a non-carrier telecommunications network, including signaling equipment and transport equipment different from the signaling equipment and transport equipment in the carrier telecommunications network, the method comprising the steps of:

a) receiving a call made to a virtual telephone number and carried by the equipment of the carrier telecommunications network at a switch in the non-carrier network;

b) querying a database correlating virtual telephone numbers with actual telephone numbers representing end user equipment to identify an actual telephone number corresponding to said virtual telephone number for said call;

c) determining if a service is to be applied to said call using the equipment of the non-carrier network; and d) completing said call from said switch in the non-carrier network to said end user equipment represented by said actual telephone number.

2. The method of claim 1 further including the step of providing in-call monitoring of said call.

3. The method of claim 1 wherein step c) includes the step of determining that a forwarding service will be applied to said call.

4. The method of claim 1 wherein step c) includes the step of determining that a messaging service will be applied to said call.

5. The method of claim 1 wherein step c) includes the step of determining that a waiting service will be applied to said call.

6. The method of claim 1 wherein step c) includes the step of determining that a service employing speech processing will be applied to said call.

7. The method of claim 1 wherein step c) includes the step of determining that a Centrex related service will be applied to said call.

8. The method of claim 1 further including the step of checking a trigger table to determine if said call is a special call.

9. A method of applying services to calls using a first interexchange carrier's telecommunications network and carried by a second interexchange carrier's telecommunications network, said first interexchange carrier being different from said second interexchange carrier, said calls having been made by callers to virtual telephone numbers, said first interexchange carrier's telecommunications network including an MFA switch, a node, and a database correlating said virtual telephone numbers with actual telephone numbers, each of said actual telephone numbers having been previously associated with end user equipment, the method comprising the steps of:

a) directing a call carried by the second interexchange carrier's telecommunications network made by a caller to a virtual telephone number to the MFA switch in the first interexchange carrier's telecommunications network via a LEC;

b) sending said call from the MFA switch to the node;

c) querying the database using said virtual telephone number to obtain a correlated actual telephone number;

d) sending said correlated actual telephone number and said call to the MFA switch in the first interexchange carrier's telecommunications network;

e) determining, in the first interexchange carrier's telecommunications network, whether a service is to be applied to said call;

f) if yes, applying said service to said call; and g) completing said call from the MFA switch, to the end user equipment associated with said correlated actual telephone number.

10. The method of claim 9 further including the step of hairpinning said call to provide in-call monitoring.

11. The method of claim 9 wherein said determining step includes the step of determining that a forwarding service will be applied.

12. The method of claim 9 wherein said determining step includes the step of determining that a messaging service will be applied.

13. The method of claim 9 wherein said determining step includes the step of determining that a waiting service will be applied.

14. The method of claim 9 wherein said determining step includes the step of determining that a service employing speech processing will be applied.

15. The method of claim 9 wherein said determining step includes the step of determining that a Centrex-type service will be applied.

16. The method of claim 9 further including the step of checking a trigger table to prevent redundant processing of said call.

17. The method of claim 9 further including the step of checking a trigger table to determine if said call is a special call.

18. A method of processing calls comprising the steps of:

a) receiving a call, made by a caller to a virtual telephone number and carried by transport and signaling equipment of a first interexchange carrier's telecommunications network, at an MFA switch in said first interexchange carrier's telecommunications network;

b) determining at said MFA switch if said call is a special call using a Dialed Number Trigger Table and, if not, routing said call to its destination, otherwise;

c) querying a database correlating virtual telephone numbers with actual telephone numbers representing at least one end user device to identify an actual telephone number corresponding to said virtual telephone number for said call, d) determining if a first service is to be applied to said call by transport and signaling equipment of a second interexchange carrier's telecommunications network and, if not, determining if a second service is to be applied to said call by said transport and signaling equipment of said first interexchange carrier's telecommunications network, and, if so, applying said service; and e) routing said call from said MFA switch to said end user device represented by said actual telephone number.

19. A system for applying services to calls made to virtual telephone numbers and carried over a first telecommunications network including signaling and transport equipment, said first telecommunications network having been selected by a caller as the carrier network for a call, the system comprising:

a second telecommunications network, different from said first telecommunications network, said second telecommunications network being a network which was not selected by said caller as the carrier network for said call and including signaling and transport equipment, an MFA switch, an MFA node and a database correlating virtual telephone numbers with actual telephone numbers representing end user devices, said MFA switch in said second telecommunications network being constructed for receiving said call made to a virtual telephone number and carried by the first telecommunications network, said call having been routed from a LEC to said MFA switch in said second telecommunications network, said MFA node being constructed for receiving said call from said MFA switch, means in said second telecommunications network for querying said database using said virtual telephone number to obtain a correlated actual telephone number and for sending said correlated actual telephone number and said call back to said MFA switch;

said second telecommunications network further including means associated with said MFA switch for determining whether a service is to be applied to said call and, if yes, for applying said service; and means for completing said call from said MFA switch to an end user device represented by said correlated actual telephone number.

20. The system of claim 19, further including means in said second telecommunications network for monitoring calls carried by said first telecommunications network.

21. The system of claim 19, wherein said querying means includes said MFA Node.

* * * * *